Figure 1:
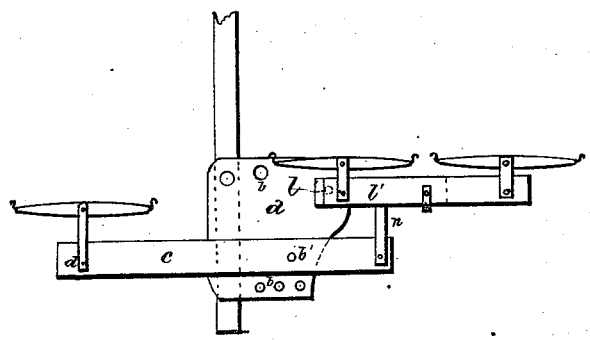
Figure 2:
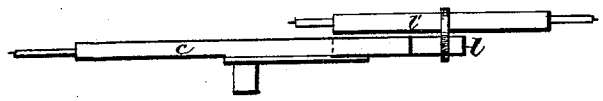

W. McCLELLAND, Sr.
Draft Equalizer.

No. 161,623.  
Patented April 6, 1875.

UNITED STATES PATENT OFFICE.

WILLIAM McCLELLAND, SR., OF FOWLER, ILLINOIS.

IMPROVEMENT IN DRAFT-EQUALIZERS.

Specification forming part of Letters Patent No. 161,623, dated April 6, 1875; application filed November 18, 1874.

*To all whom it may concern:*

Be it known that I, WILLIAM MCCLELLAND, Sr., of Fowler, in the county of Adams and State of Illinois, have invented certain new and useful Improvements in Draft-Equalizers; and I do hereby declare the following to be a full, clear, and exact description of the invention, such as will enable others skilled in the art to which it pertains to make and use it, reference being had to the accompanying drawings, which form part of this specification.

My invention relates to an improvement in draft-equalizers; and consists in an application of a compound lever, to maintain an equality in the draft of three horses, when required to work abreast with a tongue between them.

The accompanying drawing represents my invention.

A plate, $a$, of iron or other suitable material, is firmly attached to the hind part of the tongue of a vehicle, plow, or reaper, and which extends over the edge of the tongue toward the side where the two horses are at work. In this plate, $a$, is a series of holes, $b$, to allow a change in the position of the plate for adjustment from side to side, to lengthen or shorten the leverage, and pivoted upon this plate, toward the side away from the tongue, at $b'$, is a lever, $c$. Two-thirds of this lever extend from its pivot toward and beyond the tongue, and at that end, $d$, is an ordinary single-tree for one horse, fastened in the usual way. Pivoted to the side of the plate, and in front of the lever $c$, is a short lever, $l$, which is connected at its center with the short end of the lever $c$ by the straps $n$, thus forming a compound lever. To the outer end of this short lever is attached a common double tree, $l'$, for two horses. The combination of levers, as here represented, shows that the two horses pull against the lever $l$, and, by it, against the short arm of lever $c$, making their combined efforts equal to the longer arm of lever $c$, where one horse only pulls against them; but when two horses are employed, in order to equalize the side draft on reapers, remove the plate $a$ farther sidewise, over the tongue, and fasten your bolts through the next two holes in the plate.

Having thus described my invention, I claim—

1. The adjustable supporting-plate $a$, substantially as shown.

2. The combination of the long lever $c$, short lever $l$, connecting-straps $n$, supporting-plate $a$, and the means of attachment for the horses, substantially as described.

In testimony that I claim the foregoing I have hereunto set my hand this 1st day of October, 1874.

WILLIAM McCLELLAND, SR.

Witnesses:
   GEO. M. JANES,
   W. H. BENNESON.